(12) United States Patent
Cha et al.

(10) Patent No.: US 8,000,256 B2
(45) Date of Patent: Aug. 16, 2011

(54) METHOD AND APPARATUS FOR DATA TRANSMISSION OF RADIO LINK CONTROL LAYER IN A MOBILE COMMUNICATION SYSTEM

(75) Inventors: Hwa-Jin Cha, Seongnam-si (KR); Seong-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 906 days.

(21) Appl. No.: 11/945,431

(22) Filed: Nov. 27, 2007

(65) Prior Publication Data

US 2008/0130619 A1    Jun. 5, 2008

(30) Foreign Application Priority Data

Nov. 27, 2006  (KR) .................. 10-2006-0117907
Jul. 25, 2007  (KR) .................. 10-2007-0074553

(51) Int. Cl.
H04L 12/56  (2006.01)
H04L 1/18  (2006.01)
H04J 3/16  (2006.01)
(52) U.S. Cl. .................. 370/252; 370/346; 714/749
(58) Field of Classification Search .................. None
See application file for complete search history.

(56) References Cited

U.S. PATENT DOCUMENTS

| | | | |
|---|---|---|---|
| 7,558,243 B2 | 7/2009 | Jiang | |
| 2003/0095519 A1* | 5/2003 | Kuo et al. | 370/338 |
| 2003/0223385 A1* | 12/2003 | Jiang | 370/324 |
| 2004/0032851 A1* | 2/2004 | Wu | 370/346 |
| 2004/0160937 A1* | 8/2004 | Jiang | 370/349 |
| 2004/0184437 A1* | 9/2004 | Lee et al. | 370/349 |
| 2006/0154603 A1* | 7/2006 | Sachs et al. | 455/39 |
| 2006/0245410 A1* | 11/2006 | Jiang | 370/346 |
| 2006/0251105 A1* | 11/2006 | Kim et al. | 370/449 |
| 2007/0104109 A1* | 5/2007 | Jiang | 370/244 |
| 2008/0056148 A1* | 3/2008 | Wu | 370/252 |
| 2008/0298322 A1* | 12/2008 | Chun et al. | 370/335 |

FOREIGN PATENT DOCUMENTS

| | | |
|---|---|---|
| EP | 1 389 886 | 2/2004 |
| JP | 2000-278358 | 10/2000 |
| KR | 1020060051278 | 5/2006 |
| KR | 1020060090191 | 8/2006 |

OTHER PUBLICATIONS

Li-Chun Wang et al., Gap-Processing Time Analysis of Stall Avoidance Mechanisms for High Speed Downlink Packet Access With Parallel Harq Schemes, 2005 International Conference on Wireless Networks, Communications and Mobile Computing, Jun. 2005.

Yi-Chiun Chen et al., Simulation Analysis of RLC for Packet Data Services in UMTS Systems, The 14th IEEE 2003 International Symposium on Personal, Indoor and Mobile Radio Communications Sep. 2003.

* cited by examiner

Primary Examiner — Steven H Nguyen
(74) Attorney, Agent, or Firm — The Farrell Law Firm, P.C.

(57) ABSTRACT

Disclosed is a method and apparatus for transmitting data of a Radio Link Control (RLC) layer in a mobile communication system. Before an RLC SDU stored in a transmission buffer is discarded, a status report for checking a reception status of a receiving side is requested by a polling trigger either when transmission of the RLC SDU has not been completed, or when an RLC SDU discard timer for the RLC SDU approaches the expiration time, thereby enhancing the data transmission performance of the RLC layer.

16 Claims, 10 Drawing Sheets

METHOD AND APPARATUS FOR DATA TRANSMISSION OF RADIO LINK CONTROL LAYER IN A MOBILE COMMUNICATION SYSTEM

PRIORITY

This application claims priority to an application entitled "Method and Apparatus for Data Transmission of Radio Link Control Layer in Mobile Communication System" filed with the Korean Intellectual Property Office on Nov. 27, 2006 and assigned Serial No. 2006-117907, and filed Jul. 25, 2007 and assigned Serial No. 2007-74553, the contents of each of which are incorporated herein by reference.

BACKGROUND OF THE INVENTION

1. Field of the Invention

The present invention relates to a mobile communication system, and more particularly to a method and apparatus for transmitting data of a radio link control (RLC) layer.

2. Description of the Related Art

The Universal Mobile Telecommunication Service (UMTS) system is a $3^{rd}$ generation asynchronous mobile communication system using a wideband Code Division Multiple Access (CDMA) scheme based on Global System for Mobile communications (GSM) and General Packet Radio Services (GPRS), both of which are European mobile communication systems.

The Third-Generation Partnership Project (3GPP), responsible for the UMTS standardization, is currently discussing Long Term Evolution (LTE) as the next generation UMTS system. The LTE is targeted for commercialization around 2010 and is a technology for implementing high-speed packet based communication at about 100 Mbps. To this end, various plans are under discussion, including a plan to reduce the number of nodes located on a communication path by simplifying a network architecture, a plan to approximate wireless protocols to a radio channel as close as possible, and so forth.

Figure 1:
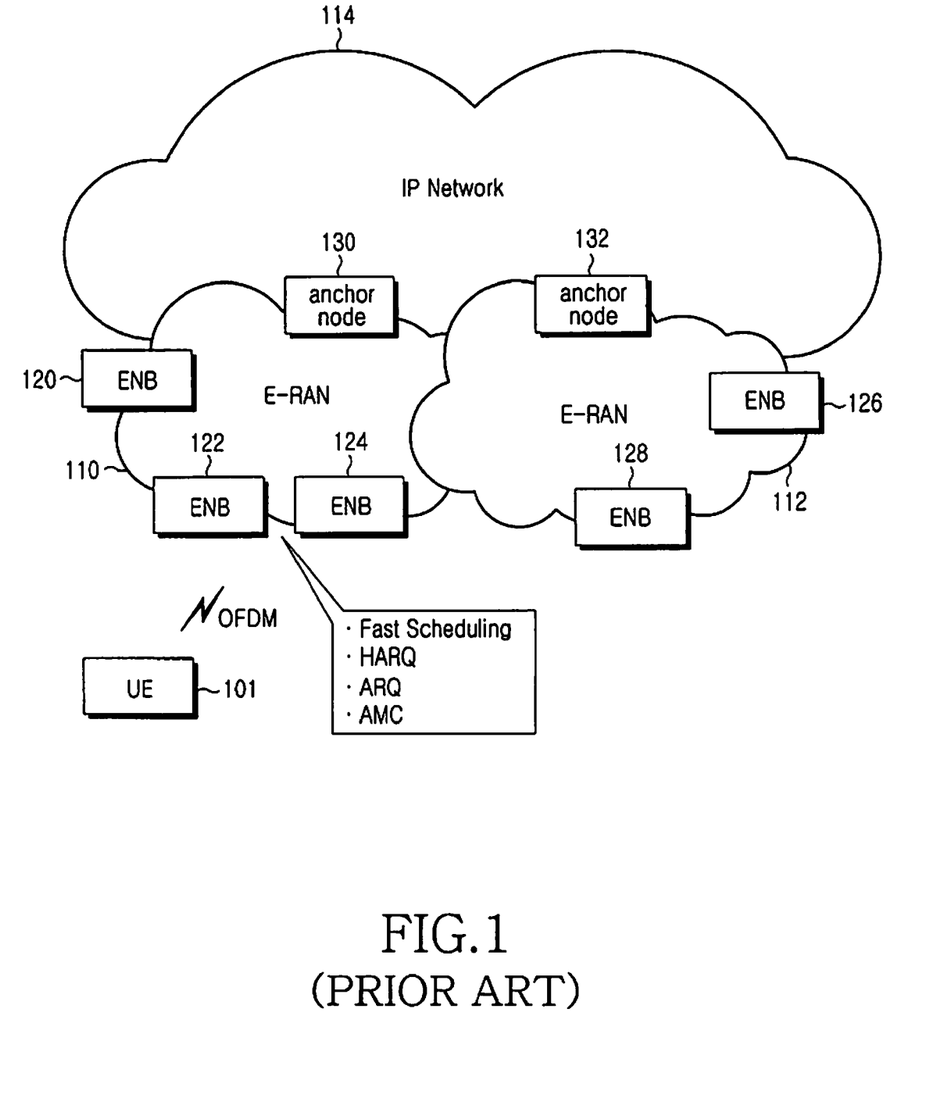
FIG. 1 is a block diagram illustrating the configuration of a next-generation mobile communication system.

FIG. 1 is a block diagram illustrating the configuration of an evolved UMTS mobile communication system.

Evolved UMTS Radio Access Networks ("E-UTRANs" or "E-RANs") 110 and 112 are simplified into 2-node structures of Evolved Node Bs ("ENBs" or "Node B") 120, 122, 124, 126, and 128 and, anchor nodes 130 and 132. A User Equipment (UE) 101 accesses an Internet Protocol (IP) network 114 over the E-RANs 110 and 112.

The ENBs 120 to 128 correspond to the existing Node Bs of the UMTS system and connect to the UE 101 through a radio channel. In comparison with the existing Node Bs, the ENBs 120 to 128 perform more complex functions. Because all user traffic, as well as a real-time service, such as Voice over IP (VoIP) using an IP, are transmitted through a Shared CHannel (SCH) in the LTE system, a device capable of collecting situation information of UEs and performing a scheduling process is required. The ENBs 120 to 128 are responsible for the collecting and scheduling processes.

The LTE system performs a Hybrid Automatic Repeat Request (HARQ) between the ENBs 120 to 128 and the UE 101 as in High Speed Downlink Packet Access (HSDPA) and Enhanced uplink Dedicated CHannel (E-DCH). However, because various Quality of Service (QoS) requirements cannot be satisfied only by the HARQ scheme, an outer Automatic Repeat request (ARQ) may be performed in an upper layer. The outer ARQ is also performed between the UE 101 and the ENBs 120 to 128.

To implement a transmission rate of a maximum of 100 Mbps, the LTE system may employ a wireless access technology of an Orthogonal Frequency Division Multiplexing (OFDM) scheme at a system bandwidth of 20 MHz. An Adaptive Modulation & Coding (AMC) scheme for setting a modulation scheme and a channel coding rate according to a channel state of the UE may be employed in the LTE system.

Many next-generation mobile communication systems as well as the LTE system use the HARQ scheme as an error correction scheme. HARQ is a scheme which increases a reception success rate by soft-combining previously received data with retransmitted data, without discarding the previously received data. In more detail, an HARQ receiving side determines if there is an error in received data, and transmits a positive Acknowledgement (HARQ ACK) signal for the HARQ or negative Acknowledgement (HARQ NACK) signal for the HARQ to an HARQ transmitting side. The HARQ transmitting side either retransmits the HARQ data or transmits new HARQ data according to the HARQ ACK/NACK signal. Then, the HARQ receiving side soft-combines the retransmitted data with previously received data, thereby reducing an error occurrence rate.

Figure 2:
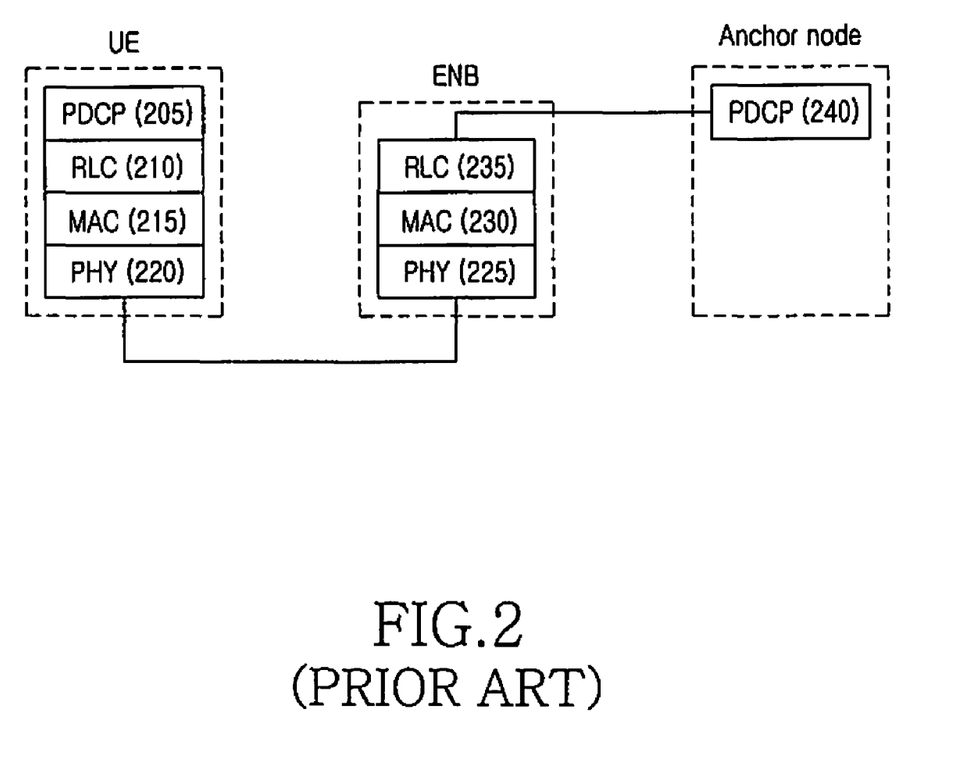
FIG. 2 is a diagram illustrating the protocol stacks of a next-generation mobile terminal.

FIG. 2 is a view illustrating the protocol stacks of a next-generation mobile terminal.

Each packet data convergence protocol (PDCP) layer 205 and 240 functions to compress/decompress an Internet Protocol (IP) header. Each Radio Link Control (RLC) layer 210 and 235 performs an operation of resizing RLC service data units (RLC SDUs) into RLC Protocol Data Units (PDUs) having an appropriate size and operates as an ARQ device performing an ARQ operation with respect to the RLC PDUs. Data input to a specific protocol entity from an upper layer is referred to as an SDU of the specific protocol. As shown in FIG. 2, the PDCP layers 205 and 240 are located in a UE and an upper layer, and the RLC layers 210 and 235 are located in the UE and an ENB.

Medium Access Control (MAC) layers 215 and 230 are connected to a plurality of RLC entities configured in one UE, multiplex RLC PDUs from each RLC entity into a MAC PDU, and demultiplex a MAC PDU from a lower layer into RLC PDUs. Data output from a specific protocol entity is referred to as a PDU.

Each PHYsical layer (PHY) 220 and 225 generates OFDM symbols by performing channel-coding and modulation operations with respect to upper-layer data, and transmits the OFDM symbols through a radio channel. Also, each physical layer 220 and 225 transmits OFDM symbols received through a radio channel to an upper layer, after demodulating and channel-decoding the OFDM symbols. Most HARQ operations, including the operations of performing a channel decoding with respect to received data, soft-combining the channel-decoded data with previously received data, and performing a Cyclic Redundancy Check (CRC) operation with respect to soft-combined data, are performed by the physical layers 220 and 225, and are controlled by the MAC layers 215 and 230.

As described above, the RLC layers 210 and 235 ensure reliable data transmission/reception through the ARQ process.

Figure 3:
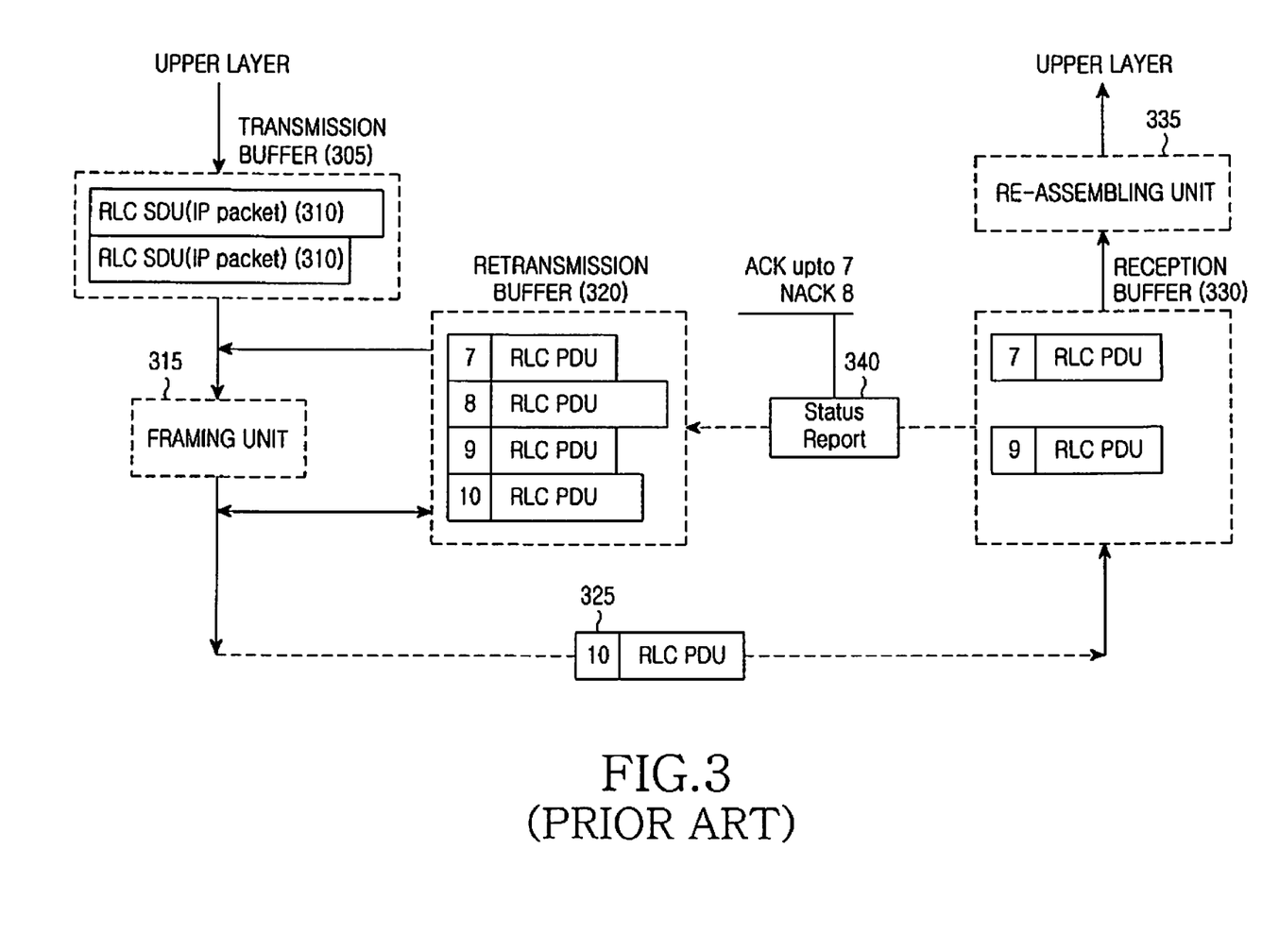
FIG. 3 is a block diagram illustrating a data transmission/reception and retransmission process of an RLC layer.

FIG. 3 is a block diagram illustrating a data transmission/reception and retransmission process of an RLC layer.

A transmission buffer 305 of a transmitting-side RLC layer stores RLC SDUs 310 provided from a transmitting-side PDCP layer until the RLC SDUs 310 are transmitted to a receiving-side RLC layer. A framing unit 315 re-configures the RLC SDUs 310 to RLC PDUs 325 having an appropriate length, and transmits the RLC PDUs 325 to the receiving-side RLC layer after attaching an ascending serial number to each RLC PDU. In this case, the RLC SDUs 310 are buffered in a retransmission buffer 320 until an ACKnowledgement (ACK) signal is received from the receiving-side RLC layer. The receiving-side RLC layer stores received RLC PDUs, detects an RLC PDU lost during the transmission by checking the serial numbers of the stored RLC PDUs, and requests the transmitting-side RLC layer to retransmit the lost RLC PDU. RLC PDUs reordered in a reception buffer 330 are assembled into RLC SDUs through a re-assembling unit 335, and are then transferred to an upper layer.

According to the example shown in FIG. 3, while RLC PDU [7] to RLC PDU [10] have been transmitted from the transmitting-side RLC layer, only RLC PDU [7] and RLC PDU [9] have been received by the receiving-side RLC layer and have been stored in the reception buffer 330. The receiving-side RLC layer transmits a status report 340 containing ACK and/or non-acknowledgement (NACK) information, which informs that the RLC PDU [7] and RLC PDU [9] have been correctly received, but RLC PDU [8] has not been received, to the transmitting-side RLC layer. Then, the transmitting-side RLC layer retransmits the RLC PDU [8], which has been stored in the transmission buffer 320, based on the status report 340, and discards the RLC PDU [7] and RLC PDU [9].

When there is a missing RLC PDU, the status report 340 may be transmitted either based on a determination of the receiving-side RLC layer itself or by a request of the transmitting-side RLC layer. A transmission request for a status report issued by the transmitting-side RLC layer is referred to as a "polling."

Figure 4:
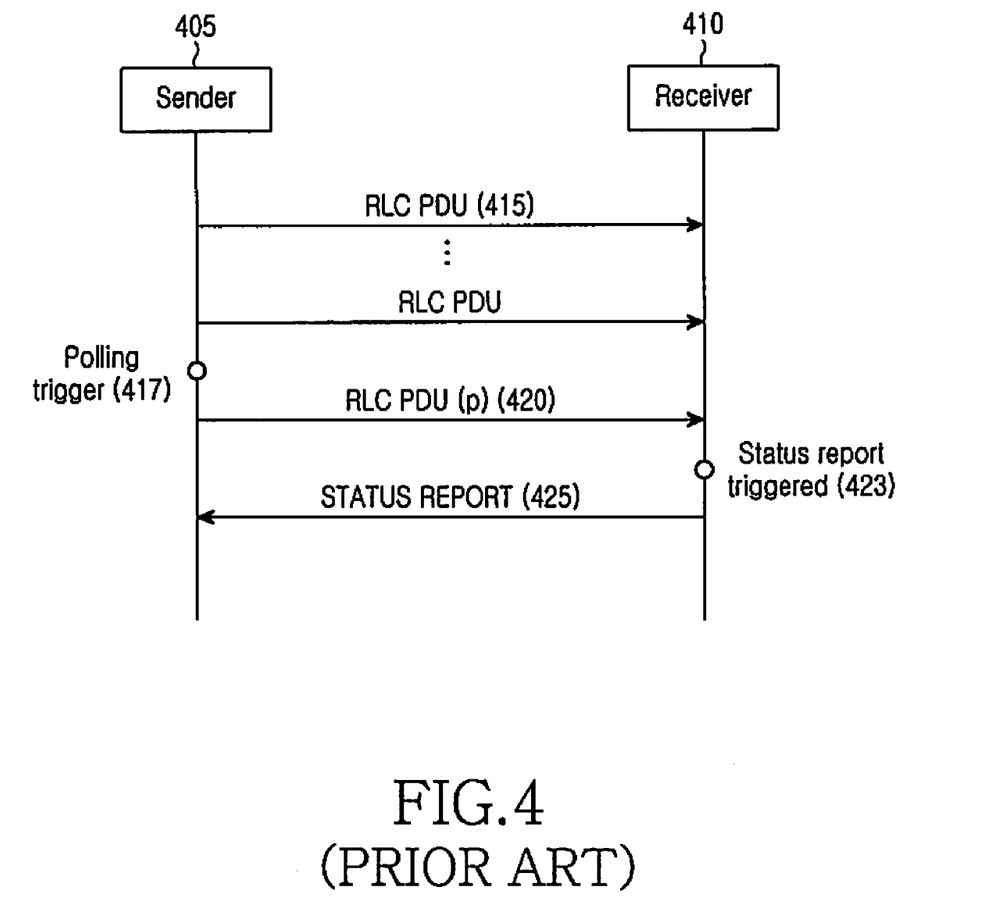
FIG. 4 is a diagram illustrating an example of a polling trigger of an RLC layer and a status report transmission process.

FIG. 4 is a view illustrating an example of a polling trigger of an RLC layer and a status report transmission process.

When a transmitting-side RLC layer 405 needs to check an RLC PDU reception state of a receiving-side RLC layer 410 while transmitting RLC PDUs 415 to the receiving-side RLC layer 410, the transmitting-side RLC layer 405 triggers a polling process, which is referred to as a "polling trigger" 417. The polling trigger represents setting a polling bit "p" in an RLC PDU 420 to be transmitted next. When the receiving-side RLC layer 410 has received the RLC PDU 420 including the set polling bit, the receiving-side RLC layer 410 triggers transmission of a status report (see reference number 423). Then, a status report 425 including ACK/NACK information representing a reception status of a reception buffer is configured, and is transmitted to the transmitting-side RLC layer.

A transmission buffer of the transmitting-side RLC layer stores RLC SDUs transferred from an upper layer. The transmitting-side RLC layer supports a discarding function in order to prevent the transmission buffer from overflowing. The discarding function may be implemented by a method using a timer operation, or may be implemented by a method of setting a maximum number of times. However, according to the conventional function of discarding for RLC SDUs, even though there is an RLC PDU for which an ACK signal has not been received from a receiving-side RLC layer to a transmitting-side RLC layer, the RLC PDU may be discarded from the transmission buffer of the transmitting-side RLC layer, thereby causing a failure of data transmission.

SUMMARY OF THE INVENTION

Accordingly, the present invention has been made to solve at least the above-mentioned problems occurring in the prior art, and the present invention provides a method and apparatus for performing, if necessary, a retransmission process of an RLC PDU associated with an RLC SDU stored in a transmission buffer before a transmitting-side RLC layer discards the RLC SDU.

Also, the present invention provides a method and apparatus for checking a reception status of a receiving-side RLC layer before a transmitting-side RLC layer discards an RLC SDU stored in a transmission buffer.

In addition, the present invention provides a method and apparatus for triggering an RLC polling before a transmitting-side RLC layer discards an RLC SDU stored in a transmission buffer.

In accordance with an aspect of the present invention, there is provided a method for transmitting data of a Radio Link Control (RLC) layer in a mobile communication system, the method includes transmitting a Service Data Unit (SDU), which has been transferred from an upper layer, through at least one Protocol Data Unit (PDU); requesting a receiving side to transmit a status report about a data reception status at a start of a predetermined period of time before the SDU is discarded; receiving the status report, and retransmitting a non-acknowledged PDU based on the status report; and discarding the SDU when it is determined that transmission of the SDU has failed.

In accordance with another aspect of the present invention, there is provided an apparatus for transmitting data of a Radio Link Control (RLC) layer in a mobile communication system, the apparatus includes a transmission buffer for storing a Service Data Unit (SDU) transferred from an upper layer in order to transmit the SDU; a controller for requesting a receiving side to transmit a status report about a data reception status at a start of a predetermined period of time before the SDU is discarded, determining to retransmit a non-acknowledged Protocol Data Unit (PDU) based on the status report, and discarding the SDU from the transmission buffer when it is determined that transmission of the SDU has failed; and a framing unit for framing the SDU transferred from the transmission buffer into at least one PDU in order to transmit the SDU to the receiving side.

In accordance with still another aspect of the present invention, there is provided a method for transmitting data of a Radio Link Control (RLC) layer in a mobile communication system, the method includes storing a Service Data Unit (SDU) transferred from an upper layer in order to transmit the SDU, and starting a timer; transmitting the SDU through at least one Protocol Data Unit (PDU); determining if the timer approaches a preset threshold value before an expiration time when a PDU to be transmitted next is scheduled; requesting a receiving side to transmit a status report about a data reception status when the timer approaches the expiration time; and discarding the SDU when the timer has expired.

In accordance with still another aspect of the present invention, there is provided an apparatus for transmitting data of a Radio Link Control (RLC) layer in a mobile communication system, the apparatus includes a transmission buffer for storing a Service Data Unit (SDU) transferred from an upper layer in order to transmit the SDU; a controller for starting a timer when the SDU is stored, determining if the timer approaches a preset threshold value before an expiration time when a Protocol Data Unit (PDU) to be transmitted next is scheduled, requesting a receiving side to transmit a status report about a data reception status when the timer approaches the expiration time, and discarding the SDU from the transmission buffer when the timer has expired; and a framing unit for framing the SDU transferred from the transmission buffer into at least one PDU in order to transmit the SDU to the receiving side.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may obscure the subject matter of the present invention. Terms described in the following description are defined by taking functions thereof into consideration, so they may vary according to users, operator's intention, or custom. Accordingly, the terms must be defined based on the entire contents of the present application.

One main aspect of the present invention is to check a reception state of a receiving apparatus by performing a polling trigger before a transmitting apparatus discards data buffered therein when the transmitting apparatus has not received an acknowledgement (ACK) signal of the data, thereby improving a data transmission performance.

Hereinafter, while the present invention will be described with respect to a Radio Link Control (RLC) layer of an Long Term Evolution (LTE) system evolved from a Universal Mobile Telecommunication Service (UMTS) system as an example, the present invention can be applied to all mobile communication systems to which an Automatic Repeat reQuest (ARQ) operation is applied, without any modification in the construction.

The present invention is intended to solve a problem of data transmission failure caused by discarding an RLC SDU by a transmitting-side RLC layer even though there is an RLC PDU for which an acknowledgement signal has not been received from a receiving-side RLC layer. The problem to be solved by the present invention will now be described in more detail with reference to FIG. 5.

Figure 5:
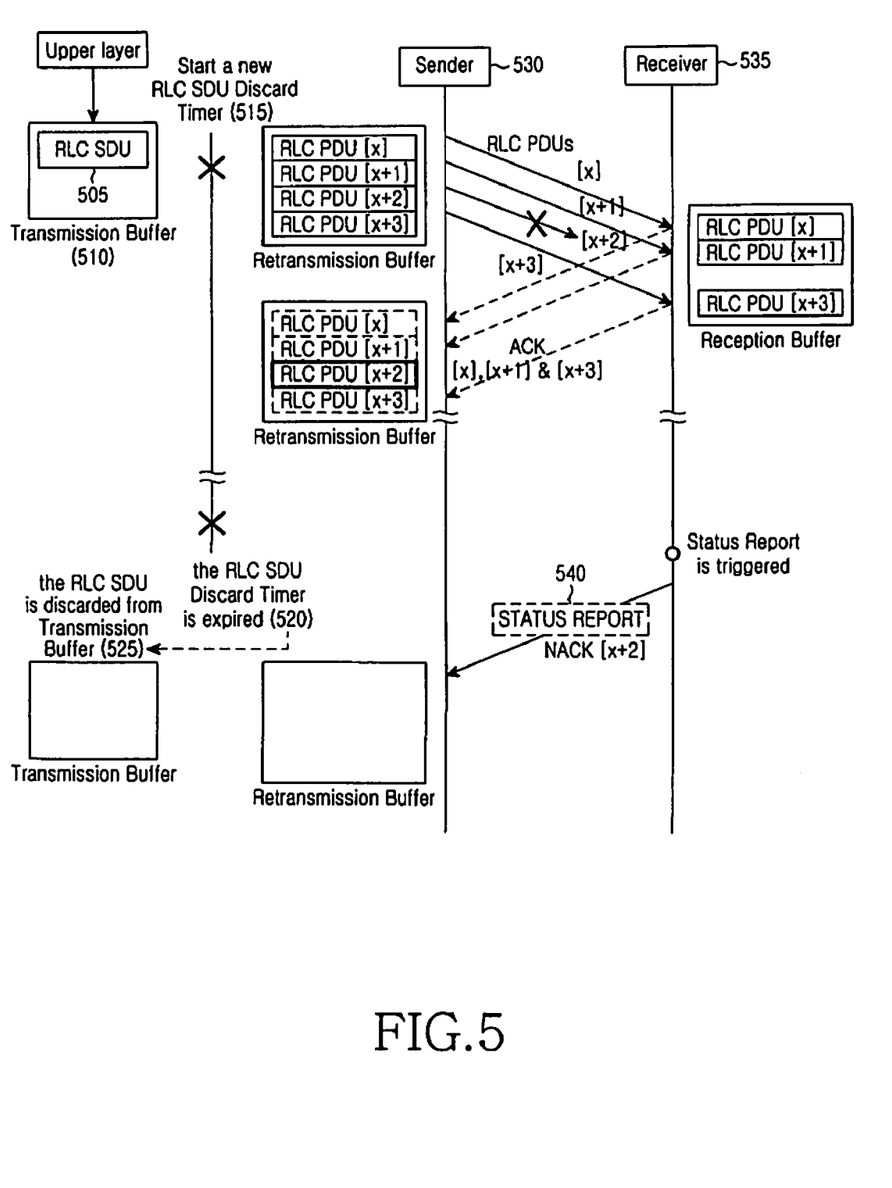
FIG. 5 is a block diagram illustrating an existing operation of discarding an RLC SDU.

FIG. 5 is a block diagram illustrating an operation of discarding an RLC SDU.

When an RLC SDU 505 has been transferred to a transmitting-side RLC layer 530 from an upper layer, the RLC SDU 505 is stored in a transmission buffer 510. When an RLC SDU discarding function using a timer operation is supported, the transmitting-side RLC layer 530 starts an RLC SDU discard timer at the moment of storing the RLC SDU 505 in the transmission buffer 510 at step 515. The RLC SDU discard timer operates until it is determined that the RLC SDU 505 has completely arrived at a receiving-side RLC layer 535. The RLC SDU 505 is re-configured into four RLC PDUs [x] to [x+3] and is then transmitted to the receiving-side RLC layer 535, in which the RLC PDUs are transmitted and/or retransmitted between the transmitting-side RLC layer 530 and the receiving-side RLC layer 535.

When the discard timer has expired at step 520, the transmitting-side RLC layer 530 discards the RLC SDU 505 of the transmission buffer 510 at step 525, and simultaneously discards RLC PDU(s) associated with the RLC SDU 505 from a retransmission buffer. However, in this case, if the transmitting-side RLC layer 530 has not received an acknowledgement signal for the RLC PDU [x+2] associated with the RLC SDU 505 by the expiration time of the discard timer at step 520, and subsequently receives a status report 540 requesting retransmission of the RLC PDU [x+2] from the receiving-side RLC layer 535, the transmitting-side RLC layer 530 cannot retransmit the RLC PDU [x+2] (because the RLC PDU [x+2] has already been discarded), so that transmission of the RLC SDU 505 fails.

Such a problem is caused because the transmitting side unconditionally discards RLC SDUs without checking a data reception status if only the RLC SDU discard timer has expired. Therefore, according to the present invention, a transmitting-side RLC layer checks a reception status of a receiving-side RLC layer before discarding an RLC SDU, and performs a retransmission operation when there is missing data, thereby preventing data transmission failure due to the discarding of the RLC SDU. In detail, the transmitting-side RLC layer performs a polling trigger for requesting the receiving-side RLC layer to report the reception status thereof, at the start of a predetermined period of time before an RLC SDU is discarded. In order to check the start of the predetermined period of time, a timer or a time threshold value may be used. Hereinafter, exemplary embodiments of the present invention will be described in detail.

Figure 6:
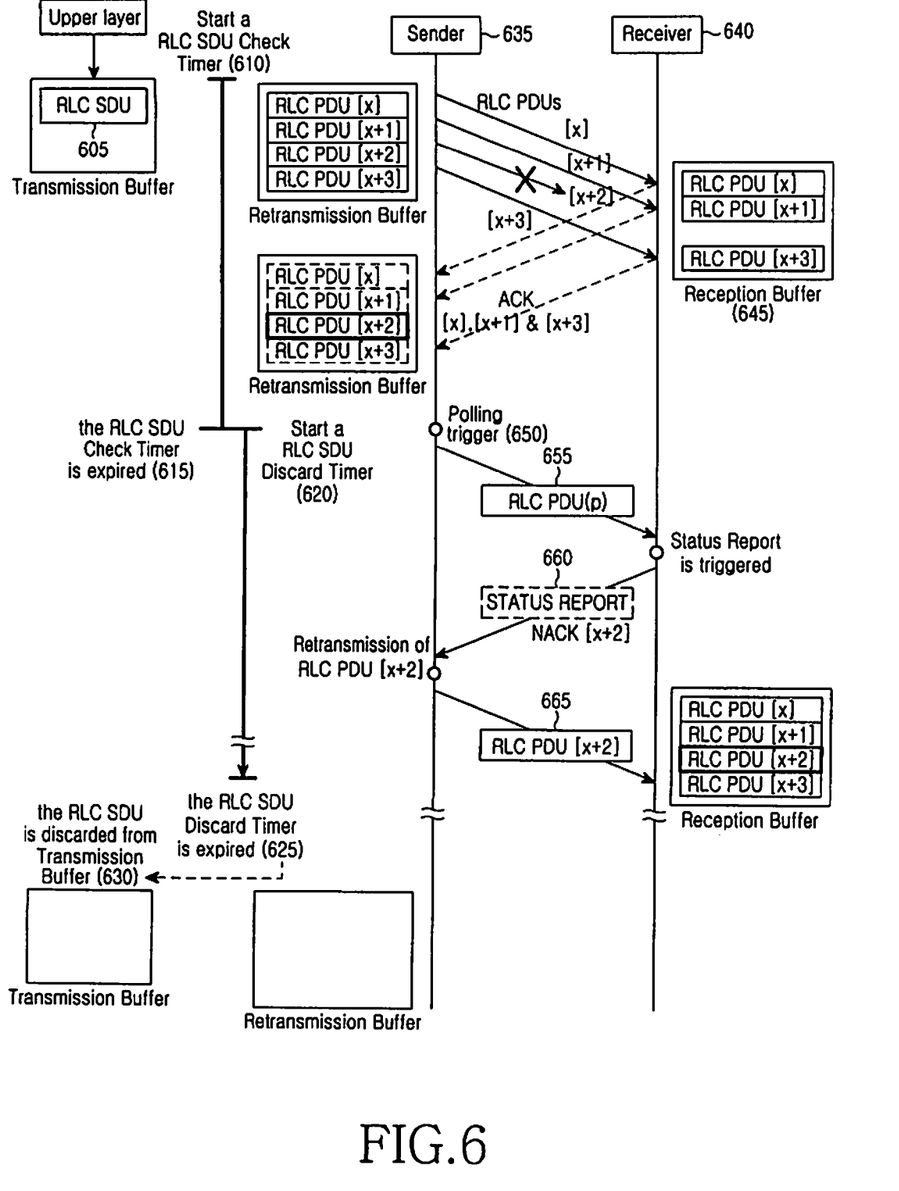
FIG. 6 is a block diagram illustrating the entire operation according to a first embodiment of the present invention.

FIG. 6 is a block diagram illustrating the operation of the first embodiment of the present invention.

When receiving an RLC SDU 605 from an upper layer, a transmitting-side RLC layer 635 starts an RLC SDU check timer at step 610, and stores the RLC SDU 605 in a transmission buffer. The RLC SDU 605 is re-configured into four RLC PDUs [x] to [x+3] and is then transmitted to a receiving-side RLC layer 640, but the RLC SDU check timer has expired at a state in which the receiving-side RLC layer 640 has not normally received and stored the RLC PDU [x+2] in a reception buffer 645 thereof at step 615.

When the RLC SDU check timer has expired, the transmitting-side RLC layer 635 starts an RLC SDU discard timer at step 620, and performs a polling trigger 650 for checking a reception status of the receiving-side RLC layer 640 as shown at 650. By executing the polling trigger as shown at 650, a polling bit "p" is set in an RLC PDU 655 to be transmitted next.

When receiving the RLC PDU 655 in which the polling bit has been set from the transmitting-side RLC layer 635, the receiving-side RLC layer 640 transmits a status report 660 representing status information of the reception buffer 645 to the transmitting-side RLC layer 635. The status report 660 contains a NACK [x+2] signal representing that the RLC PDU [x+2] has not been normally received.

Through the status report 660 of the receiving-side RLC layer 640, the transmitting-side RLC layer 635 recognizes that the RLC PDU [x+2] has not been received, and retransmits the RLC PDU [x+2] to the receiving-side RLC layer 640 as shown at 665. Thereafter, when the RLC SDU discard timer has expired at step 625, the transmitting-side RLC layer 635 discards the RLC SDU 605 from the transmission buffer at step 630. As described above, the polling trigger is performed as shown at 650 at the start of a predetermined period of time before the RLC SDU 605 is discarded, which has been set in the RLC SDU discard timer.

Figure 7:
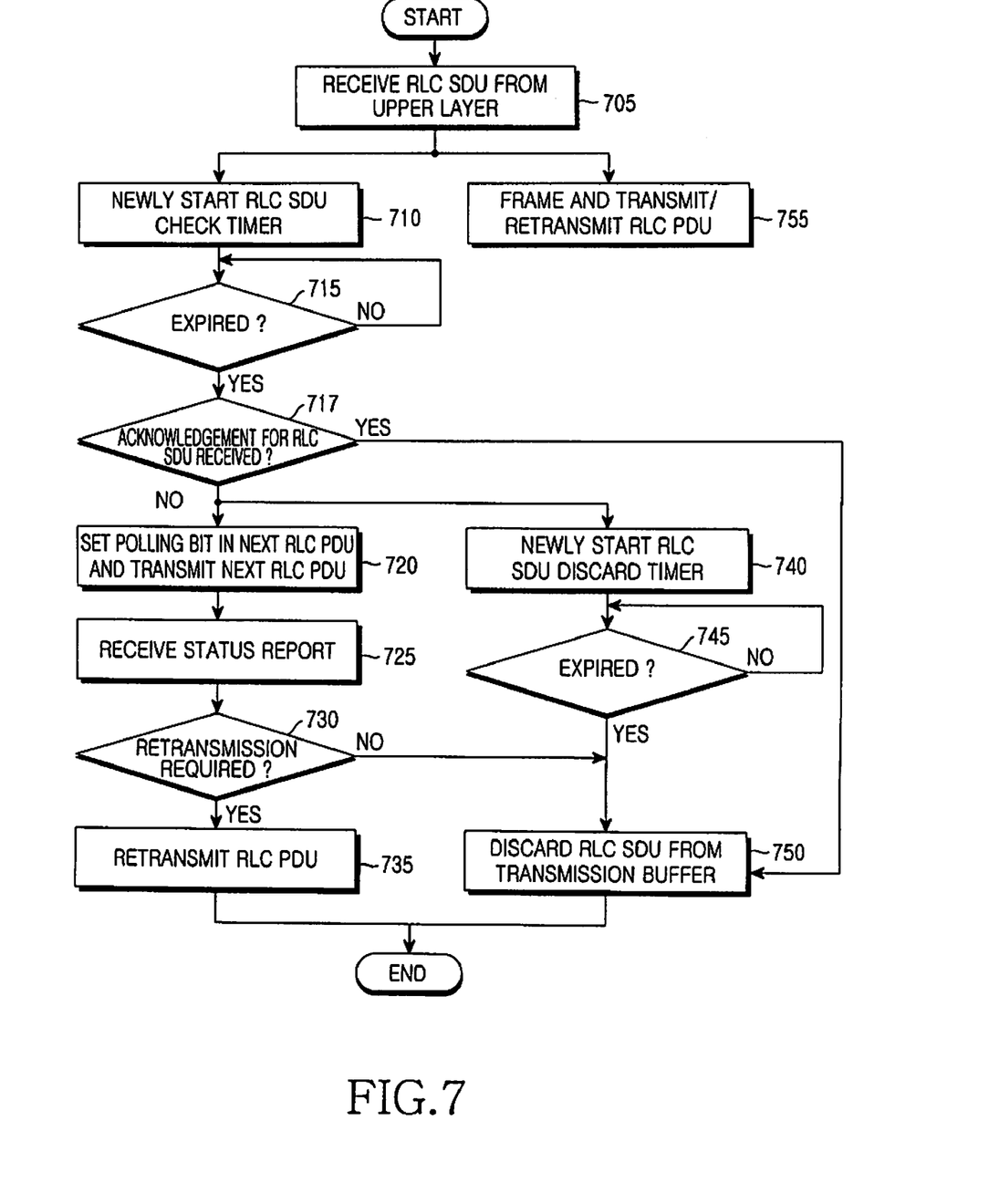
FIG. 7 is a flowchart illustrating the operation of the transmitting-side RLC layer according to the first embodiment of the present invention.

FIG. 7 is a flowchart illustrating the operation of the transmitting-side RLC layer according to the first embodiment of the present invention.

When receiving an RLC SDU from an upper layer in step 705, the transmitting-side RLC layer starts an RLC SDU check timer associated with the RLC SDU in step 710. In this case, the RLC SDU check timer is unique for the RLC SDU. At the same time as step 710, the transmitting-side RLC layer re-configures the RLC SDU into RLC PDUs, and transmits and/or retransmits the RLC PDUs to the receiving-side RLC layer according to an ARQ operation at step 755.

When the RLC SDU check timer for the RLC SDU has expired in step 715, the transmitting-side RLC layer determines if there is one or more RLC PDUs associated with the RLC SDU, an acknowledgement for which has not been received from the receiving-side RLC layer, in step 717. When it is determined that there is an RLC PDU, an acknowledgement for which has not been received, the transmitting-side RLC layer performs a polling trigger in step 720 so that a polling bit is set in an RLC PDU to be transmitted next.

After transmitting the RLC PDU in which the polling bit has been set, the transmitting-side RLC layer receives a status report containing status information of the reception buffer of the receiving-side RLC layer in step 725. Then, the transmitting-side RLC layer determines if there is an RLC PDU to be retransmitted by making reference to the status report in step 730, and retransmits a corresponding RLC PDU according to a result of the determination in step 735.

When there is an RLC PDU for which an acknowledgement has not been received, the transmitting-side RLC layer starts an RLC SDU discard timer for the RLC SDU at the same time as step 720 at step 740. The RLC SDU discard timer operates in order to buffer the RLC SDU until an expected retransmission operation has been completed from a time point when a transmission status of the non-acknowledged RLC PDU is checked. In this case, one RLC SDU discard timer exists for each RLC SDU.

When it is determined in step 717 that all RLC PDUs associated with the RLC SDU have been acknowledged by the receiving-side RLC layer, when it is determined in step 730 that there is no RLC PDU required to be retransmitted, or when it is determined in step 745 that the RLC SDU discard timer has expired, the RLC SDU is discarded from the transmission buffer in step 750.

Figure 8:
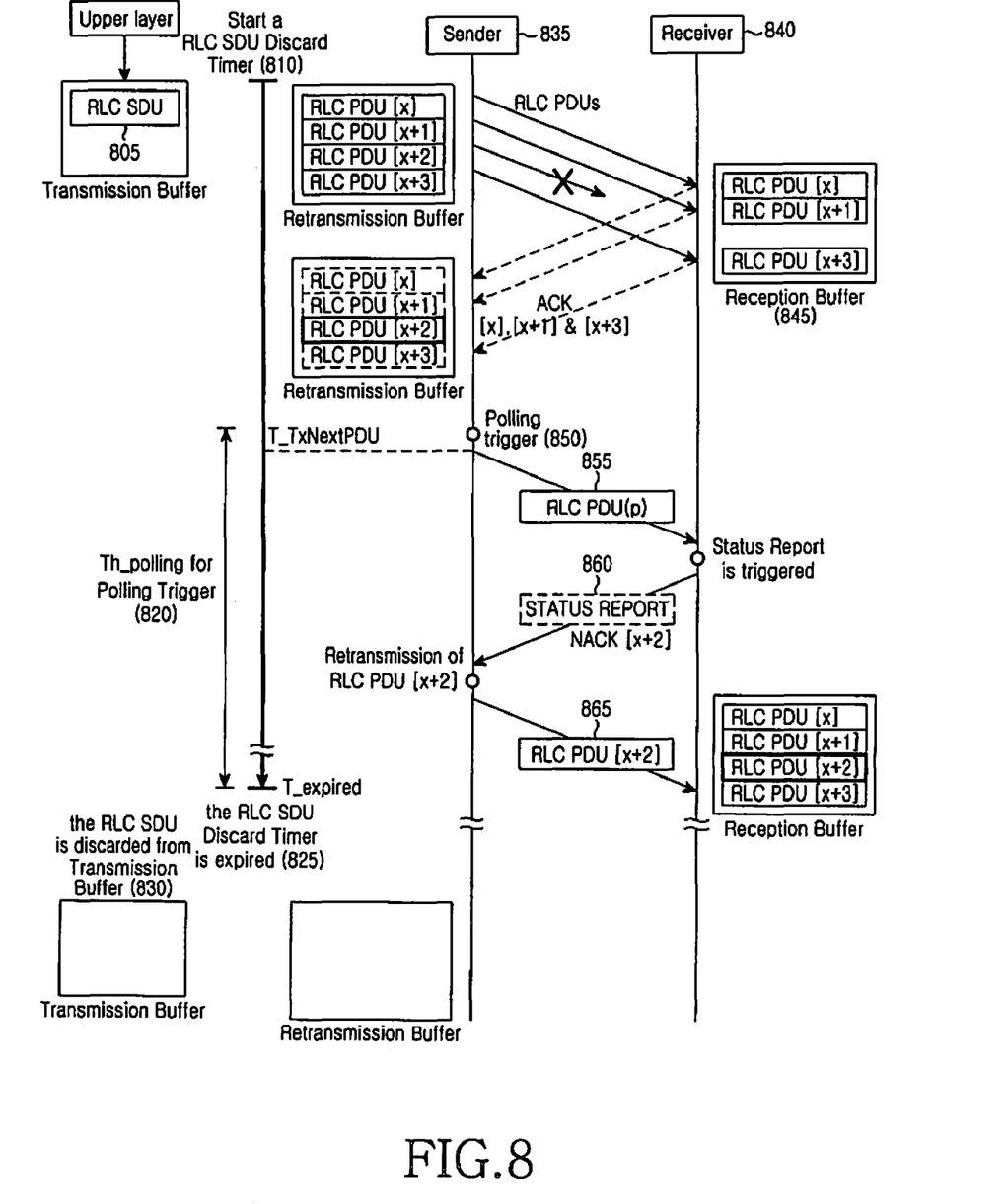
FIG. 8 is a block diagram illustrating the entire operation according to a second embodiment of the present invention.

FIG. 8 is a block diagram illustrating the operation of the second embodiment of the present invention.

When receiving an RLC SDU 805 from an upper layer, a transmitting-side RLC layer 835 starts an RLC SDU discard timer at step 810 which has been set to have a preset initial value, and stores the RLC SDU 805 in a transmission buffer. The RLC SDU 805 is re-configured into four RLC PDUs [x] to [x+3] and is then transmitted to a receiving-side RLC layer 840, but the transmitting-side RLC layer 835 is ready to transmit the next RLC PDU 855 at a state in which the receiving-side RLC layer 840 has not normally received and stored the RLC PDU [x+2] associated with the RLC SDU 805 in a reception buffer 845 thereof at step 815. For example, the RLC PDU 855 may be one of RLC PDUs constituting an RLC SDU next to the RLC SDU 805.

In this case, before transmitting the RLC PDU 855 to the receiving-side RLC layer 840, the transmitting-side RLC layer 835 determines if the RLC SDU discard timer approaches an expiration time "T_expired" by comparing a time "T_TxNextPDU" to transmit the RLC PDU 855 with the expiration time "T_expired" of the RLC SDU discard timer. The expiration time "T_expired" can be obtained from a difference between the preset initial value and the current value of the RLC SDU discard timer, and the time "T_TxNextPDU" can be obtained from a time at which the RLC PDU 855 is scheduled to be transmitted. When it is determined that the RLC SDU discard timer approaches the time "T_expired," that is, when a difference between the time "T_expired" and the time "T_TxNextPDU" is less than a "Th_polling" 820, which is a threshold value preset for a polling trigger, the transmitting-side RLC layer 835 performs a polling trigger in order to check a reception status of the receiving-side RLC layer 840 as shown at 850. By executing the polling trigger, a polling bit "p" is set in an RLC PDU 855 to be transmitted next.

When receiving the RLC PDU 855 in which the polling bit has been set from the transmitting-side RLC layer 835, the receiving-side RLC layer 840 transmits a status report 860 containing status information of the reception buffer 845 to the transmitting-side RLC layer 835. The status report 860 contains a NACK [x+2] signal representing that the RLC PDU [x+2] has not been normally received.

Through the status report 860 of the receiving-side RLC layer 840, the transmitting-side RLC layer 835 recognizes that the RLC PDU [x+2] has not been received, and retransmits the RLC PDU [x+2] to the receiving-side RLC layer 840 as shown at 865. Thereafter, when the RLC SDU discard timer has expired at step 825, the transmitting-side RLC layer 835 discards the RLC SDU 805 from the transmission buffer at step 830. As described above, the threshold value "Th_polling" is used in order to determine if a time at which the RLC SDU 805 is to be discarded approaches.

Figure 9:
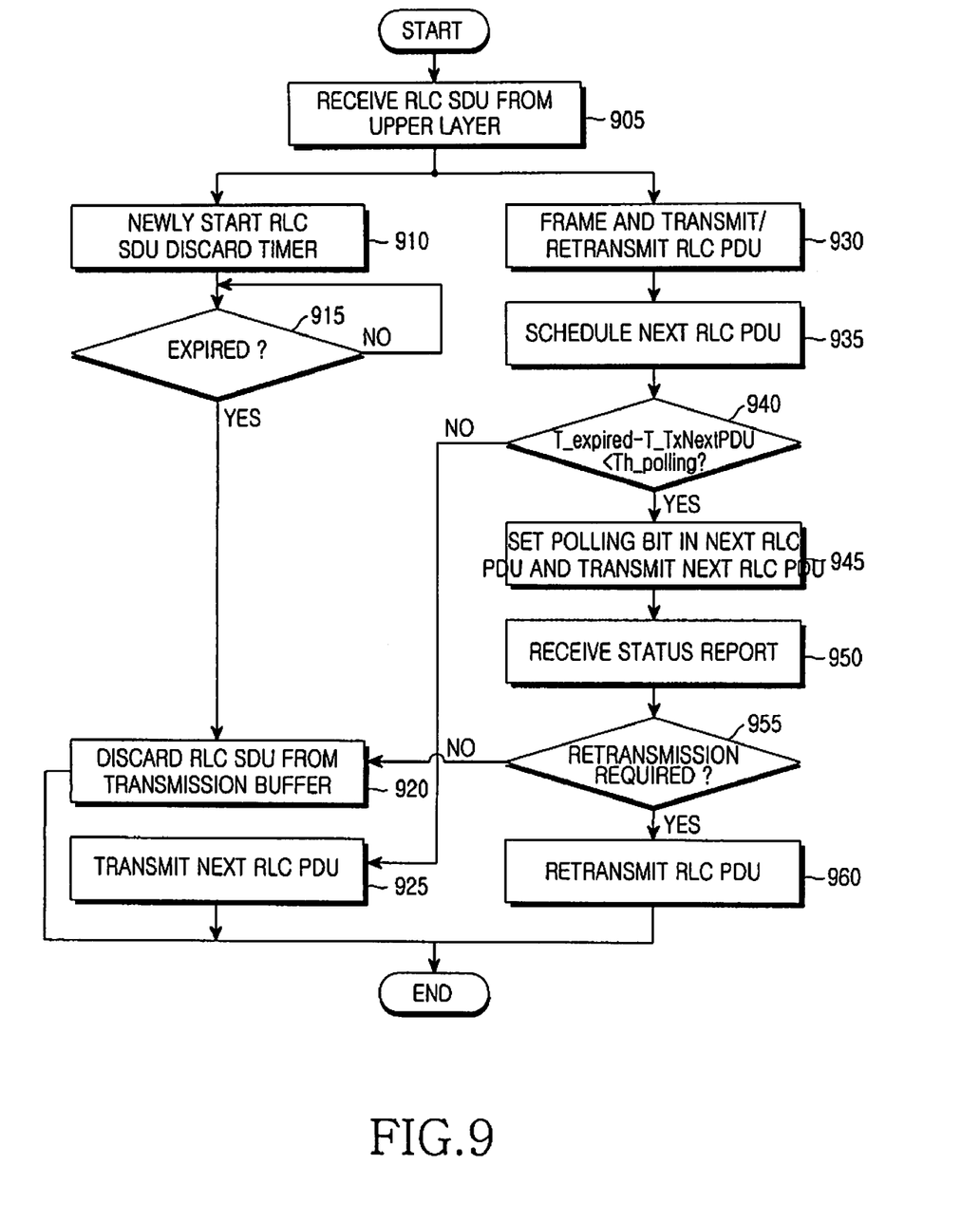
FIG. 9 is a flowchart illustrating the operation of the transmitting-side RLC layer according to the second embodiment of the present invention.

FIG. 9 is a flowchart illustrating the operation of the transmitting-side RLC layer according to the second embodiment of the present invention.

When receiving an RLC SDU from an upper layer in step 905, a transmitting-side RLC layer starts an RLC SDU check timer associated with the RLC SDU in step 910. When the RLC SDU discard timer starts, the T_expired representing a normal expiration time of the RLC SDU discard timer can be calculated. The RLC SDU discard timer is unique for the RLC SDU. When the RLC SDU discard timer has expired in step 915, the RLC SDU is discarded from the transmission buffer in step 920.

At the same time as step 910, the transmitting-side RLC layer re-configures the RLC SDU into RLC PDUs, and transmits and/or retransmits the RLC PDUs to the receiving-side RLC layer according to an ARQ operation in step 930. When an RLC PDU to be transmitted next has been scheduled in step 935, that is, a time "T_TxNextPDU" at which the next RLC PDU is to be transmitted has been determined, the transmitting-side RLC layer determines if a time "T_expired," at which the RLC SDU discard timer associated with the RLC SDU is to expire, approaches in step 940. In detail, the transmitting-side RLC layer compares a difference between the time T_expired with the time "T_TxNextPDU" at which the next RLC PDU is to be transmitted with a preset threshold value "Th_polling." When the difference is not less than the threshold value "Th_polling," it means that the time T_expired does not approach. In this case, the transmitting-side RLC layer transmits the next RLC PDU without a polling bit set therein in step 925.

When the difference is less than the threshold value "Th_polling," the transmitting-side RLC layer determines that the T_expired approaches, and performing a polling trigger in step 945. By executing the polling trigger, a polling bit is set in the next RLC PDU. According to another embodiment of the present invention, a separate indicator representing that a status report is required, instead of the polling bit, may be transmitted together with the next RLC PDU.

After transmitting the RLC PDU in which the polling bit has been set, the transmitting-side RLC layer receives a status report containing status information of the reception buffer of the receiving-side RLC layer in step 950. Then, the transmitting-side RLC layer determines if there is an RLC PDU required to be retransmitted by making reference to the status report in step 955, and retransmits a corresponding RLC PDU according to a result of the determination in step 960. In contrast, when it is determined in step 955 that there is no RLC PDU required to be retransmitted, the transmitting-side RLC layer discards the RLC SDU from the transmission buffer in step 920.

Figure 10:
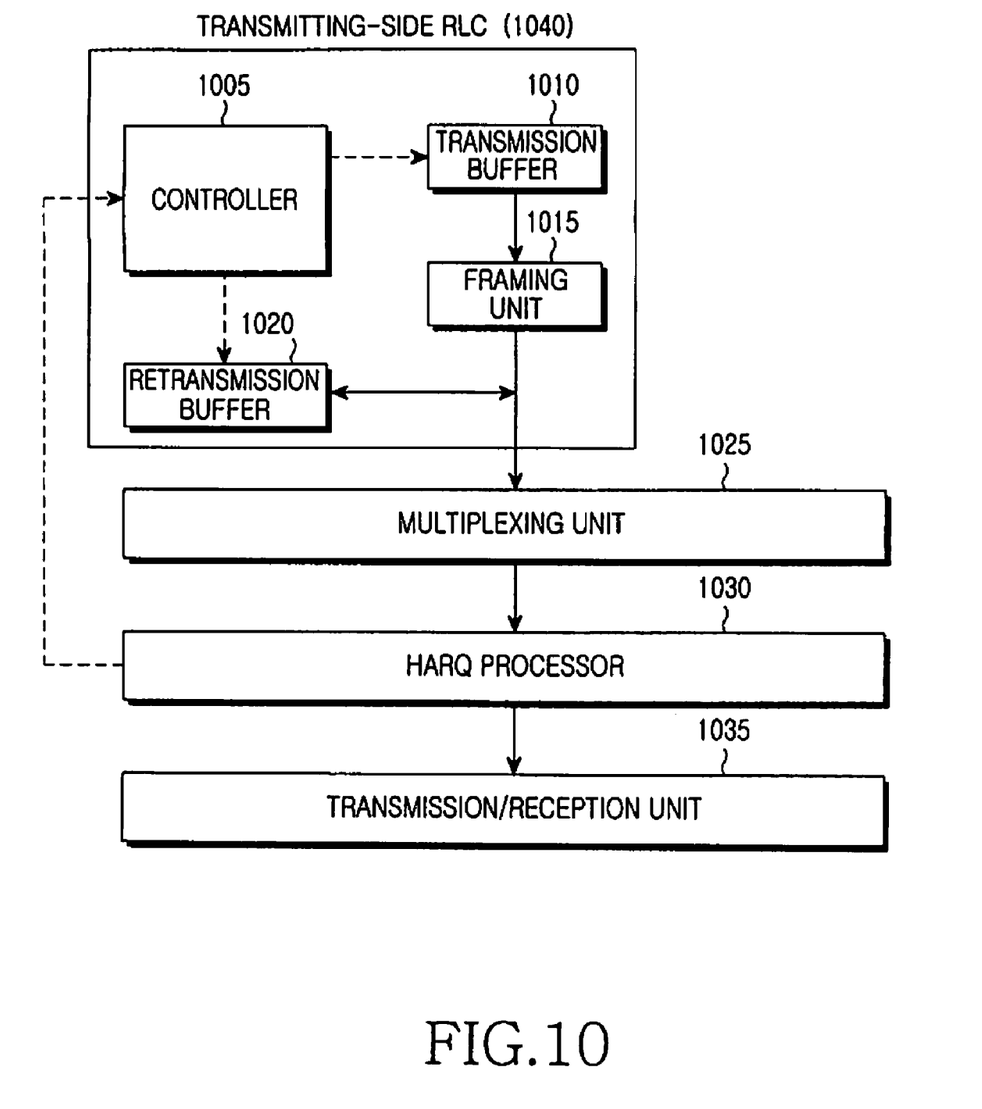
FIG. 10 is a block diagram illustrating the configuration of a transmitting-side RLC layer according to the embodiments of the present invention.

FIG. 10 is a block diagram illustrating the configuration of a transmitting-side RLC layer according to the embodiments of the present invention. A transmitting-side RLC entity 1040 includes a controller 1005, a transmission buffer 1010, a framing unit 1015, and a retransmission buffer 1020.

The transmitting-side RLC entity 1040 is connected to a multiplexing unit 1025 which operates as a MAC layer, in which the multiplexing unit 1025 multiplexes ARQ packets (i.e. RLC PDUs) transmitted from a plurality of transmitting-side RLC entities into one HARQ packet. An HARQ processor 1030 controls transmission of the HARQ packet through a predetermined HARQ operation. A transmission/reception unit 1035 converts an HARQ packet transferred from the HARQ processor 1030 into a radio signal, and transmits the radio signal. In addition, the transmission/reception unit 1035 transfers an HARQ packet obtained by demodulating a radio signal to the HARQ processor 1030.

A packet (i.e. RLC SDU) generated from an upper layer is stored in the transmission buffer 1010. The RLC SDU is reconfigured into an ARQ packet (RLC PDU) in the framing unit 1015 by framing the RLC SDU to have an appropriate size and inserting required header information including a serial number into the framed RLC SDU, and is then transferred to the multiplexing unit 1025. In this case, a duplicate of the ARQ packet (RLC PDU) is stored in the retransmission buffer 1020.

The controller 1005 receives a local NACK signal from the HARQ processor 1030, receives an ARQ ACK/NACK signal from a corresponding receiving-side RLC entity, and controls transmission and/or retransmission of ARQ packets.

According to the first embodiment of the present invention, when an RLC SDU is generated from an upper layer and is stored in the transmission buffer 1010, the controller 1005 starts an RLC SDU check timer, and performs a process of transmitting/receiving the RLC SDU according to the ARQ operation. When there is an RLC PDU associated with the RLC SDU, for which an acknowledgement signal has not been received from the receiving-side RLC entity, in the retransmission buffer 1020 by an expiration time of the RLC SDU check timer, the controller 1005 starts an RLC SDU discard timer for the RLC SDU, and performs a polling trigger in order to check a data reception status of the receiving-side RLC entity.

According to the second embodiment of the present invention, when an RLC PDU to be transmitted next is scheduled, the controller 1005 determines if there is an RLC SDU discard timer, which approaches the expiration time thereof. When the RLC SDU discard timer approaches the expiration time, the controller 1005 performs a polling trigger in order to check a reception status of the receiving-side RLC entity.

Based on a status report received from the receiving-side RLC entity by the polling trigger, the controller 1005 retransmits a corresponding RLC PDU when it has received an ARQ NACK signal, and discards a corresponding RLC SDU when it has received an ARQ ACK signal.

Although a detailed description of the operation of the receiving side according to the embodiments of the present invention is omitted, a detailed configuration of the receiving-side apparatus can be easily analogized by applying the retransmission process according to the present invention to the data transmission/reception and/or retransmission process shown in FIG. 3.

According to the present invention, the transmitting-side RLC layer checks a reception status of the receiving-side RLC layer by performing a polling trigger before it discards an RLC SDU from the transmission buffer. When transmission of an RLC PDU included in the RLC SDU has not been completed, the receiving-side RLC layer performs a retransmission process for the missing RLC PDU. Accordingly, the apparatus and method according to the present invention can prevent data transmission failure due to the discarding of the RLC SDU.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for transmitting data of a Radio Link Control (RLC) layer in a mobile communication system, the method comprising the steps of:
    transmitting a Service Data Unit (SDU), which has been transferred from an upper layer, through at least one Protocol Data Unit (PDU);
    starting a first timer when the SDU has been transferred;
    discarding the SDU, when acknowledgements for all of the at least one PDU associated with the SDU have been received by an expiration time of the first timer;
    requesting a receiving side to transmit a status report about a data reception status and starting a second timer, when the acknowledgements for all of the at least one PDU associated with the SDU have not been received by the expiration time of the first timer;
    receiving the status report, and retransmitting a non-acknowledged PDU based on the status report; and
    discarding the SDU, when the second timer has expired.

2. The method as claimed in claim 1, wherein, in the step of requesting the status report, a polling bit for requesting the status report is set in a next scheduled PDU, and the next scheduled PDU is transmitted.

3. The method as claimed in claim 1, wherein, in the step of requesting the status report, an indicator for requesting the status report is transmitted to the receiving side.

4. The method as claimed in claim 1, wherein, in the transmitting step, the SDU is framed into the at least one PDU, and each PDU is transmitted to the receiving side according to an Automatic Repeat reQuest (ARQ) operation.

5. An apparatus for transmitting data of a Radio Link Control (RLC) layer in a mobile communication system, the apparatus comprising:
   a transmission buffer for storing a Service Data Unit (SDU) transferred from an upper layer in order to transmit the SDU;
   a controller for requesting a receiving side to transmit a status report about a data reception status at a start of a predetermined period of time before the SDU is discarded, determining to retransmit a non-acknowledged Protocol Data Unit (PDU) based on the status report, and discarding the SDU from the transmission buffer when a discarding time of the SDU has passed; and
   a framing unit for framing the SDU transferred from the transmission buffer into at least one PDU in order to transmit the SDU to the receiving side,
   wherein the controller starts a first timer when the SDU has been transferred, requests the status report and starts a second timer when acknowledgement for all PDUs associated with the SDU has not been received by an expiration time of the first timer, discards the SDU when the second timer has expired, and discards the SDU when acknowledgement for all PDUs associated with the SDU have been received by the expiration time of the first timer.

6. The apparatus as claimed in claim 5, wherein the controller sets a polling bit for requesting the status report in a next schedule PDU.

7. The apparatus as claimed in claim 5, wherein the controller sets and transmits an indicator for requesting the status report, to the receiving side.

8. A method for transmitting data of a Radio Link Control (RLC) layer in a mobile communication system, the method comprising the steps of:
   storing a Service Data Unit (SDU) transferred from an upper layer in order to transmit the SDU, and starting a timer;
   transmitting the SDU through at least one Protocol Data Unit (PDU);
   determining if the timer approaches a preset threshold value before an expiration time, when a PDU to be transmitted next is scheduled;
   requesting a receiving side to transmit a status report about a data reception status, when the timer approaches the expiration time; and
   discarding the SDU, when the timer has expired,
   wherein, in the determining step, when a difference between a transmission time of the PDU to be transmitted next and the expiration time of the timer is less than the present threshold value, it is determined that the timer approaches the expiration time.

9. The method as claimed in claim 8, wherein, in the step of requesting the status report, a polling bit for requesting the status report is set in the PDU to be transmitted next, and is transmitted.

10. The method as claimed in claim 8, wherein, in the step of requesting the status report, an indicator for requesting the status report is transmitted to the receiving side.

11. The method as claimed in claim 8, further comprising a step of framing the SDU into the at least one PDU, and transmitting each PDU to the receiving side according to an Automatic Repeat reQuest (ARQ) operation.

12. An apparatus for transmitting data of a Radio Link Control (RLC) layer in a mobile communication system, the apparatus comprising:
   a transmission buffer for storing a Service Data Unit (SDU) transferred from an upper layer in order to transmit the SDU;
   a controller for starting a timer when the SDU is stored, determining if the timer approaches a preset threshold value before an expiration time when a Protocol Data Unit (PDU) to be transmitted next is scheduled, requesting a receiving side to transmit a status report about a data reception status when the timer approaches the expiration time, and discarding the SDU from the transmission buffer when the timer has expired; and
   a framing unit for framing the SDU transferred from the transmission buffer into at least one PDU in order to transmit the SDU to the receiving side,
   wherein the controller determines that the timer approaches the expiration time when a difference between a transmission time of the PDU to be transmitted next and the expiration time of the timer is less than the preset threshold value.

13. The apparatus as claimed in claim 12, wherein the controller sets a polling bit for requesting the status report in the PDU to be transmitted next.

14. The apparatus as claimed in claim 12, wherein the controller sets and transmits an indicator for requesting the status report, to the receiving side.

15. A method for transmitting data of a Radio Link Control (RLC) layer in a mobile communication system, the method comprising the steps of:
   transmitting a Service Data Unit (SDU), which has been transferred from an upper layer, through at least one Protocol Data Unit (PDU);
   starting a timer when the SDU has been transferred;
   determining if a difference between a transmission time of a PDU to be transmitted next and an expiration time of the timer is less than a threshold value;
   requesting a receiving side to transmit a status report about a data reception status of the at least one PDU, when the difference between the transmission time of the PDU to be transmitted next and the expiration time of the timer is less than the threshold value; and
   receiving the status report, and retransmitting a non-acknowledged PDU based on the status report; and
   discarding the SDU, when the timer has expired.

16. An apparatus for transmitting data of a Radio Link Control (RLC) layer in a mobile communication system, the apparatus comprising:
   a transmission buffer for storing a Service Data Unit (SDU) transferred from an upper layer in order to transmit the SDU;
   a controller for requesting a receiving side to transmit a status report about a data reception status at a start of a predetermined period of time before the SDU is discarded, determining to retransmit a non-acknowledged Protocol Data Unit (PDU) based on the status report, and discarding the SDU from the transmission buffer, when a discarding time of the SDU has passed; and
   a framing unit for framing the SDU transferred from the transmission buffer into at least one PDU in order to transmit the SDU to the receiving side, wherein the controller starts a timer when the SDU has been transferred, determines if a difference between a transmission time of a PDU to be transmitted next and an expiration time of the timer is less than a threshold value before the expiration time, when the PDU to be transmitted next is scheduled, requests the status report, when the difference between the transmission time of the PDU to be transmitted next and the expiration time of the timer is less than the threshold value, and discards the SDU, when the timer has expired.

* * * * *